United States Patent
Imai et al.

(10) Patent No.: US 9,457,795 B2
(45) Date of Patent: Oct. 4, 2016

(54) VEHICLE CONTROL DEVICE

(75) Inventors: Keita Imai, Toyota (JP); Tatsuya Imamura, Okazaki (JP); Kouichi Okuda, Toyota (JP); Tooru Matsubara, Toyota (JP); Takeshi Kitahata, Toyota (JP); Kenta Kumazaki, Toyota (JP); Yasuhiro Hiasa, Nagoya (JP); Shunya Kato, Toyota (JP); Atsushi Tabata, Okazaki (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/387,951

(22) PCT Filed: Mar. 26, 2012

(86) PCT No.: PCT/JP2012/057823
§ 371 (c)(1),
(2), (4) Date: Sep. 25, 2014

(87) PCT Pub. No.: WO2013/145104
PCT Pub. Date: Oct. 3, 2013

(65) Prior Publication Data
US 2015/0046011 A1 Feb. 12, 2015

(51) Int. Cl.
*B60W 10/08* (2006.01)
*B60W 20/00* (2016.01)
(Continued)

(52) U.S. Cl.
CPC .............. *B60W 20/106* (2013.01); *B60K 6/44* (2013.01); *B60K 6/52* (2013.01); *B60L 11/123* (2013.01);
(Continued)

(58) Field of Classification Search
CPC ............ B60K 6/52; B60K 6/44; B60K 6/36; B60K 6/543; B60W 10/08; B60W 20/00; B60W 20/106; B60W 10/06; B60W 2710/244; B60L 11/123; B60L 11/1862; B60L 15/20; B60L 11/14; B60L 2210/40; B60L 2220/14; B60L 2240/12; B60L 2240/423; B60L 2240/441; B60L 2260/28; B60L 2270/145; Y02T 10/6243; Y02T 10/7077; Y02T 10/7044; Y02T 10/7005; Y02T 10/705; Y02T 10/7241; Y02T 10/6217; Y02T 10/648; Y02T 10/6286; Y02T 10/7275; Y02T 10/6265
See application file for complete search history.

(56) References Cited

U.S. PATENT DOCUMENTS 5,176,213 A * 1/1993 Kawai ................... B60W 10/06
180/243
2002/0094908 A1* 7/2002 Urasawa ................ B60K 6/383
477/3

(Continued)

FOREIGN PATENT DOCUMENTS

JP 9-284911 A 10/1997
JP 2003-18707 A 1/2003
(Continued)

Primary Examiner — Stephen Holwerda
(74) Attorney, Agent, or Firm — Sughrue Mion, PLLC

(57) ABSTRACT

A vehicle control device is configured to select a single motor running, a multiple motor running and an engine running, such that a level of a charging capacity of an electric storage device in which the multiple motor running is selectable is higher than a level of the charging capacity in which the single motor running is selectable. During the single motor running performed with the charging capacity being equal to or greater than a first threshold value, the control device is configured, upon increase of the drive force requested by a driver of the vehicle, to select the multiple motor running when the charging capacity is equal to or greater than a second threshold value that is higher than the first threshold value, and to select the engine running when the charging capacity of the electric storage device is less than the second threshold value.

9 Claims, 8 Drawing Sheets

(51) Int. Cl.
*B60K 6/52* (2007.10)
*B60L 11/14* (2006.01)
*B60L 11/12* (2006.01)
*B60L 11/18* (2006.01)
*B60L 15/20* (2006.01)
*B60W 10/06* (2006.01)
*B60K 6/44* (2007.10)
*B60K 6/36* (2007.10)
*B60K 6/543* (2007.10)

(52) U.S. Cl.
CPC ............ *B60L 11/14* (2013.01); *B60L 11/1862* (2013.01); *B60L 15/20* (2013.01); *B60W 10/06* (2013.01); *B60W 10/08* (2013.01); *B60W 20/00* (2013.01); *B60W 20/13* (2016.01); *B60K 6/36* (2013.01); *B60K 6/543* (2013.01); *B60L 2210/40* (2013.01); *B60L 2220/14* (2013.01); *B60L 2240/12* (2013.01); *B60L 2240/423* (2013.01); *B60L 2240/441* (2013.01); *B60L 2260/28* (2013.01); *B60L 2270/145* (2013.01); *B60W 2710/244* (2013.01); *Y02T 10/623* (2013.01); *Y02T 10/6217* (2013.01); *Y02T 10/6265* (2013.01); *Y02T 10/6286* (2013.01); *Y02T 10/645* (2013.01); *Y02T 10/648* (2013.01); *Y02T 10/705* (2013.01); *Y02T 10/7005* (2013.01); *Y02T 10/7044* (2013.01); *Y02T 10/7077* (2013.01); *Y02T 10/7241* (2013.01); *Y02T 10/7275* (2013.01)

(56) References Cited

U.S. PATENT DOCUMENTS

| | | | |
|---|---|---|---|
| 2004/0134698 | A1 | 7/2004 | Yamamoto et al. |
| 2007/0193808 | A1* | 8/2007 | Perakes ................... B60K 6/445 180/242 |
| 2008/0115985 | A1* | 5/2008 | Ishikawa ................ B60K 6/445 180/65.29 |
| 2009/0090574 | A1* | 4/2009 | Kuno ..................... B60K 6/445 180/65.265 |
| 2009/0166123 | A1* | 7/2009 | Luo ........................ B60K 6/405 180/383 |
| 2011/0087390 | A1* | 4/2011 | Pandit ..................... B60K 1/00 701/22 |
| 2012/0065827 | A1* | 3/2012 | Kimura ............... B60L 11/1811 701/22 |
| 2012/0208672 | A1* | 8/2012 | Sujan ................... B60W 10/02 477/5 |

FOREIGN PATENT DOCUMENTS

| | | |
|---|---|---|
| JP | 2004-208477 A | 7/2004 |
| JP | 2005-6377 A | 1/2005 |
| JP | 2008-265598 A | 11/2008 |
| JP | 2009-143263 A | 7/2009 |
| JP | 2010-18212 A | 1/2010 |

* cited by examiner

VEHICLE CONTROL DEVICE

CROSS REFERENCE TO RELATED APPLICATIONS

This application is a National Stage of International Application No. PCT/JP2012/057823 filed Mar. 26, 2012, the contents of which are incorporated herein by reference in their entirety.

TECHNICAL FIELD

The present invention relates to a control device of a vehicle using an electric motor used for engine start as a drive force source during motor running.

BACKGROUND ART

A vehicle is well-known that includes a first electric motor outputting a starting torque at the engine start and a second electric motor coupled to wheels. For example, this corresponds to a hybrid vehicle described in Patent Document 1. In the description of Patent Document 1, the hybrid vehicle includes an engine and a first motor coupled to a drive system (drive line) of front wheels and a second motor coupled to a drive system of rear wheels, can be switched to a mode of using at least one of the engine and the first motor to drive the front wheels and a mode of using the second motor to drive the rear wheels, and may run as a four-wheel drive depending on a running condition.

PRIOR ART DOCUMENT

Patent Document

Patent Document 1: Japanese Laid-Open Patent Publication No. 2004-208477

SUMMARY OF THE INVENTION

Problem to be Solved by the Invention

As described in Patent Document 1, if the motor running can be performed by using two electric motors, a larger drive force [N] (having the same meaning as drive torque [Nm] etc.) can be generated as compared to the motor running using one electric motor. The two electric motors can be operated at respective more efficient operating points. Therefore, it is useful to cause a vehicle including at least two electric motors to perform the motor running using two electric motors. However, in the motor running using two electric motors, the first electric motor used for engine start is used also for the motor running. In other words, the first electric motor must have two functions. Therefore, in the motor running using two electric motors, the first electric motor is used for the engine start from a state in which the first electric motor is used for the motor running and, therefore, as compared to using the first electric motor for the engine start from a free state as in during motor running using only the second electric motor, engine start control becomes complicated and a shock at the engine start (engine start shock) is more likely to occur. The problem as described above is unknown and no proposal has hitherto been made on having opportunity of the motor running using two electric motors and on suppressing an occurrence frequency of an engine start shock associated with an engine start during the motor running using the two electric motors.

The present invention was conceived in view of the situations and it is therefore an object of the present invention to provide a control device of a vehicle capable of suppressing an occurrence frequency of an engine start shock at the time of engine start from motor running by two motors.

Means for Solving the Problem

To achieve the object, the first aspect of the invention provides (a) a control device of a vehicle including a first electric motor outputting a starting torque for an engine start, a second electric motor coupled to wheels, and an electric storage device giving/receiving electric power to/from each of the first and second electric motors, the control device of a vehicle configured to select motor running by one motor using only the second electric motor, motor running by two motors using the first electric motor and the second electric motor, and engine running using a drive force source including the engine, wherein (b) a charging capacity of the electric storage device allowing selection of the motor running by two motors is higher than a charging capacity of the electric storage device allowing selection of the motor running by one motor, wherein (c) in the motor running by two motors and the engine running, a drive force larger than the motor running by one motor is generated, wherein (d) while the motor running by one motor is performed with a charging capacity of the electric storage device equal to or greater than a first threshold value defined in advance, when a driver's drive request amount to the vehicle is increased, (e) when the charging capacity of the electric storage device is equal to or greater than a second threshold value defined higher than the first threshold value, the motor running by two motors is selected, and wherein (f) when the charging capacity of the electric storage device is less than the second threshold value, the engine running is selected.

Effects of the Invention

Consequently, since the motor running by two motors is selected while the charging capacity of the electric storage device is higher as compared to the motor running by one motor, a time until switching to the engine running after a shift to the motor running by two motors (i.e., time until the engine is started) is made longer. During this period, a measure such as starting the engine from the motor running by one motor can be implemented by taking an opportunity of shifting to the motor running by one motor, and the switching from the motor running by two motors to the engine running itself is hardly caused. From another viewpoint, since the motor running by two motors is not selected at a lower charging capacity resulting in relatively early switching to the engine running after the shift to the motor running by two motors, i.e., since a shift to the motor running by two motors is made difficult, the switching from the motor running by two motors to the engine running itself is hardly caused. Since the duration time of the motor running after the shift to the motor running by two motors is made longer or the engine is started earlier to make a shift to the motor running by two motors difficult, the switching from the motor running by two motors to the engine running itself is hardly caused. Therefore, the occurrence frequency of an engine start shock at the engine start from the motor running by two motors can be suppressed.

The second aspect of the invention provides the control device of a vehicle recited in the first aspect of the invention, wherein the motor running by one motor is selectable when a charging capacity of the electric storage device is equal to or greater than a first threshold value defined in advance, wherein the motor running by two motors is selectable when a charging capacity of the electric storage device is equal to or greater than a second threshold value defined in advance, and wherein the second threshold value is higher than the first threshold value. Consequently, the switching from the motor running by two motors to the engine running itself is hardly caused.

To achieve the object, the other invention provides (a) a control device of a vehicle including a first electric motor outputting a starting torque for an engine start, a second electric motor coupled to wheels, and an electric storage device giving/receiving electric power to/from each of the first and second electric motors, the control device of a vehicle configured to select motor running by two motors using the first electric motor and the second electric motor and engine running using a drive force source including the engine, wherein (b) the engine running is started when a charging capacity of the electric storage device is less than a predetermined third threshold value, wherein (c) the motor running by two motors can be selected when the charging capacity of the electric storage device is equal to or greater than a predetermined fourth threshold value, wherein (d) the fourth threshold value is higher than the third threshold value, and wherein (e) the motor running by two motors can be selected until the charging capacity of the electric storage device reaches a value less than the third threshold value during the motor running by two motors.

MODE FOR CARRYING OUT THE INVENTION

Figure 1:
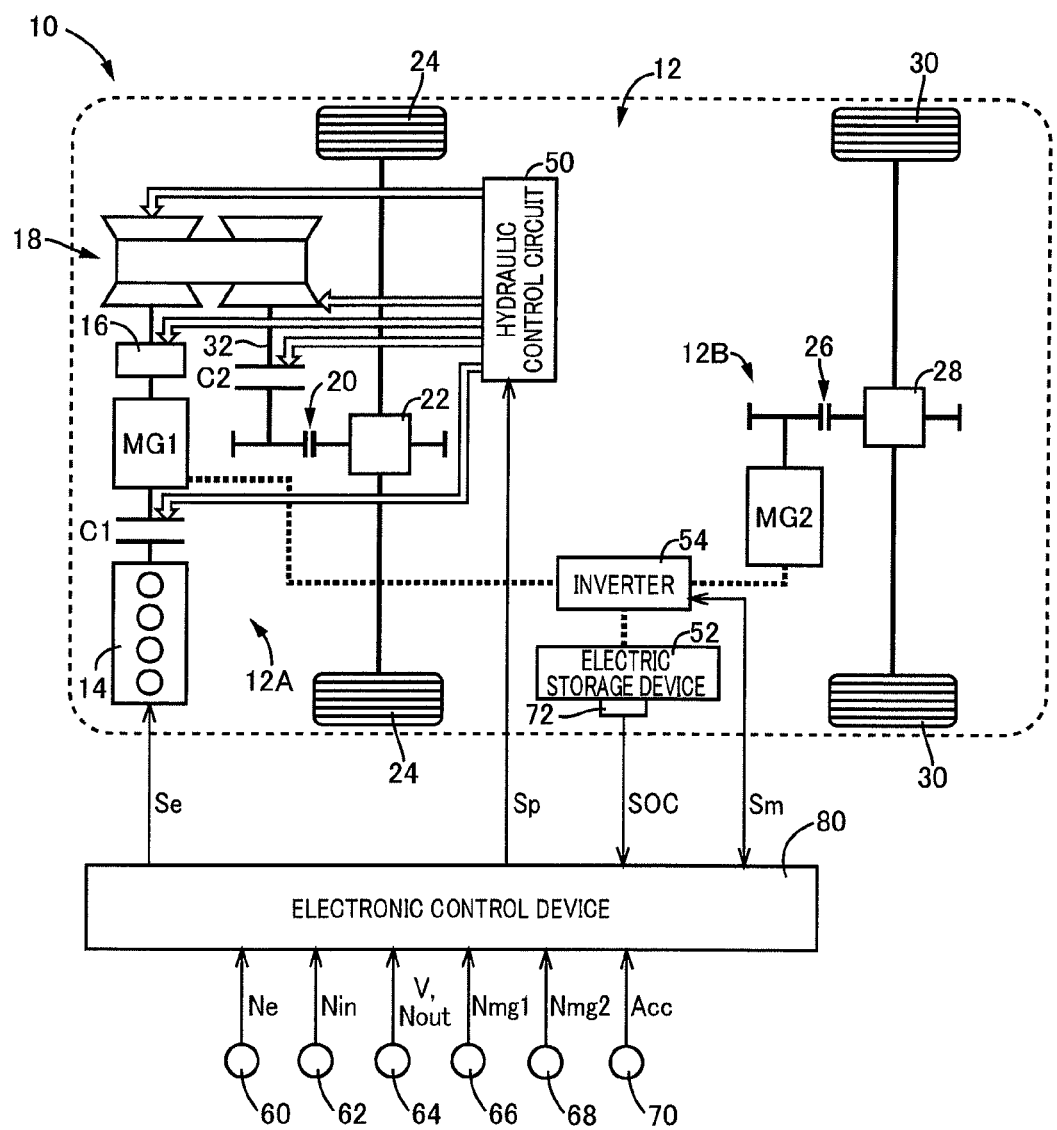
FIG. 1 is a diagram for explaining a general configuration of a vehicle to which the present invention is applied, and is a block diagram for explaining a main portion of a control system disposed on the vehicle.

In the present invention, preferably, in the control device of a vehicle described in the second or third aspect of the invention, the second threshold value is changed based on a continuous operation time under a high load running state in which a decrease speed of a charging capacity of the electric storage device is equal to or greater than a predetermined speed (or in which a driver's drive request amount to the vehicle is equal to or greater than a predetermined request amount). For example, when the continuous operation time is longer, the threshold value is made higher as compared to when the time is shorter. As a result, while a longer duration time of the motor running by two motors tends to facilitate switching to the engine running, since the duration time of the motor running by two motors is predicted to change the threshold value depending on an immediately preceding continuous operation time under the high load running state reflecting vehicle mass, road condition, driver's habit, etc., the switching from the motor running by two motors to the engine running itself is hardly caused.

Preferably, in the control device of a vehicle described in the second or third aspect of the invention, the threshold value (particularly, the second threshold value) is changed based on a decrease speed of a charging capacity of the electric storage device. For example, when the decrease speed of a charging capacity of the electric storage device is faster, the threshold value is made higher as compared to when the speed is slower. As a result, while a faster decrease speed of a charging capacity of the electric storage device after a shift to the motor running by two motors tends to facilitate the switching to the engine running, since the threshold value is changed depending on the decrease speed of the charging capacity reflecting the high load running state and a state of an electric load such as an air-conditioner etc., the switching from the motor running by two motors to the engine running itself is hardly caused.

Preferably, the second threshold value is changed based on a future running distance attainable by the motor running sequentially determined in a running state while a charging capacity of the electric storage device is decreasing. For example, when the future running distance is longer, the threshold value is made lower as compared to when the distance is shorter. As a result, although when the second threshold value is changed based on the continuous operation time under the high load running state or when the second threshold value is changed based on a decrease speed of a charging capacity of the electric storage device, if the second threshold value is made higher, the engine is started on the side of a longer future running distance attainable by the motor running, since the threshold value is changed depending on the future running distance, the switching from the motor running by two motors to the engine running itself is hardly caused. The switching to the engine running is hardly caused while the future running distance attainable by the motor running is long.

Preferably, in the control device of a vehicle of any one of the first to third aspects of the invention, a differential mechanism is included that has a plurality of rotating elements respectively coupled to the first electric motor, the second electric motor, and the engine; the differential mechanism has a rotating element coupled to the first electric motor, a rotating element that is an output rotating member coupled to the wheels in a power transmittable manner, and a rotating element coupled to a crankshaft of the engine as the plurality of the rotating elements; the second electric motor is coupled to the wheels in a power transmittable manner; a lock mechanism is further included that couples one of the rotating elements other than the rotating elements coupled to the first electric motor and the second electric motor to a non-rotating member through a lock actuation; and when the engine is started during the motor running using the output torques from both the first electric motor and the second electric motor during a state of the lock actuation of the lock mechanism, the lock mechanism is caused to perform a non-lock actuation to output a cranking torque starting the engine by the first electric motor and to compensate a reaction torque of the cranking torque by the second electric motor. In this way, the motor running by one motor, the motor running by two motors, and the engine running can be selected.

Preferably, in the control device of a vehicle of any one of the first to third aspects of the invention, the vehicle includes a differential mechanism having a plurality of rotating elements respectively coupled to the first electric motor, the second electric motor, and the engine, and a connecting/disconnecting clutch connecting/disconnecting a power transmission path between the engine and the rotating element coupled to the first electric motor such that a rotating element coupled to none of the first and second electric motors is used as an output rotating member, and when the engine is started during the motor running while the vehicle is running with the connecting/disconnecting clutch released, the starting torque is output by the first electric motor coupled to the connecting/disconnecting clutch while the connecting/disconnecting clutch is engaged. In this way, the motor running by one motor, the motor running by two motors, and the engine running can be selected.

Preferably, the vehicle may be a known hybrid vehicle and a so-called plug-in hybrid vehicle having the electric storage device chargeable from a charging stand, a household power source, etc. Particularly, since the plug-in hybrid vehicle is considered to have maximum input/output allowable values of the electric storage device made larger than the hybrid vehicle, the motor running can be performed in a region covering a higher drive request amount, for example. In this case, the electric motors can be restrained from increasing in size by enabling both the first and second electric motors to be used as running drive force sources rather than making the second electric motor larger, for example.

An example of the present invention will now be described in detail with reference to the drawings.

First Example

FIG. 1 is a diagram for explaining a general configuration of a hybrid vehicle 10 (hereinafter referred to as a vehicle 10) to which the present invention is applied, and is a block diagram for explaining a main portion of a control system disposed for controlling the portions of the vehicle 10. In FIG. 1, a drive device 12 making up the vehicle 10 includes a front drive portion 12A and a rear drive portion 12B.

The front drive portion 12A includes an engine 14 that is an internal combustion engine, as well as a first clutch C1, a first electric motor MG1, a known forward/backward switching device 16 capable of switching output rotation to a positive side and a negative side relative to input rotation in accordance with engagement actuation of an engagement device, a known belt type continuously variable transmission 18, a second clutch C2, a first gear pair 20, and a front differential gear device 22 disposed in order from the engine 14 side and coupled to each other in series, and drives front drive wheels 24 that are a pair of left and right front-side wheels. As described above, the engine 14 and the first electric motor MG1 are connected such that a drive force can be transmitted to the front drive wheels 24.

The rear drive portion 12B includes a second electric motor MG2, as well as a second gear pair 26 and a rear differential gear device 28 disposed in order from the second electric motor MG2 side and coupled to each other in series, and drives rear drive wheels 30 that are a pair of left and right rear-side wheels. As described above, the second electric motor MG2 is coupled such that a drive force can be transmitted to the rear drive wheels 30.

Both the first electric motor MG1 and the second electric motor MG2 are AC synchronous motor generators having functions of an electric motor and an electric generator and are electrically connected to an electric storage device 52 such that electric power can be given/received via an inverter 54 to/from the electric storage device 52 included in the vehicle 10. The first electric motor MG1 is a first rotating machine mechanically coupled via the first clutch C1 to the engine 14 and acts as a starter motor outputting a starting torque at the engine start. The second electric motor MG2 is a second rotating machine mechanically coupled to the rear drive wheels 30.

Each of the first clutch C1 and the second clutch C2 is made up of a well-known wet multi-plate type clutch and engagement/release thereof is controlled by a hydraulic control circuit 50. The first clutch C1 is disposed between the engine 14 and the first electric motor MG1. The second clutch C2 is disposed between a transmission output shaft 32 acting as an output rotating member of the belt type continuously variable transmission 18 and the front drive wheels 24. The first clutch C1 and the second clutch C2 are a connecting/disconnecting device capable of connecting/disconnecting the coupling of the engine 14 to/from the front drive wheels 24. In the disconnected state of the connecting/disconnecting device, at least one of the first clutch C1 and the second clutch C2 is released such that power cannot be transmitted and, in the connected state of the connecting/disconnecting device, both the first clutch C1 and the second clutch C2 are engaged in a power transmittable manner.

The vehicle 10 includes an electronic control device 80 as a control device controlling the portions of the vehicle 10. The electronic control device 80 includes a so-called microcomputer including a CPU, a RAM, a ROM, and an I/O interface, for example, and the CPU executes signal processes in accordance with programs stored in advance in the ROM, while utilizing a temporary storage function of the RAM, to provide various controls of the vehicle 10. For example, the electronic control device 80 provides vehicle control such as hybrid drive control related to the engine 14, the first electric motor MG1, the second electric motor MG2, etc., shift control of the belt type continuously variable transmission 18, and engagement control of the first clutch C1 and the second clutch C2 and is configured separately for the various controls as needed. The electronic control device 80 is supplied with various signals (e.g., an engine rotation speed Ne that is a rotation speed of the engine 14, a transmission input rotation speed Nin that is a rotation speed of an input rotating member of the belt type continuously variable transmission 18, a transmission output rotation speed Nout that is a rotation speed of the transmission output shaft 32 corresponding to a vehicle speed V, a first electric motor rotation speed Nmg1 that is a rotation speed of the first electric motor MG1, a second electric motor rotation speed Nmg2 that is a rotation speed of the second electric motor MG2, an accelerator opening degree Acc corresponding to a driver's drive request amount, and a state of charge (charging capacity) SOC of the electric storage device 52) based on detection values from various sensors (e.g., an engine rotation speed sensor 60, a transmission input rotation speed sensor 62, a transmission output rotation speed sensor 64, a first electric motor rotation speed sensor 66 such as a resolver, a second electric motor rotation speed sensor 68 such as a resolver, an accelerator opening degree sensor 70, and a battery sensor 72) disposed on the vehicle 10. The electronic control device 80 supplies various command signals (e.g., an engine control command signal Se, a hydraulic control command signal Sp, and an electric motor control command signal Sm) to devices (e.g., the engine 14, the hydraulic control circuit 50, and the inverter 54) disposed on the vehicle 10.

Figure 2:
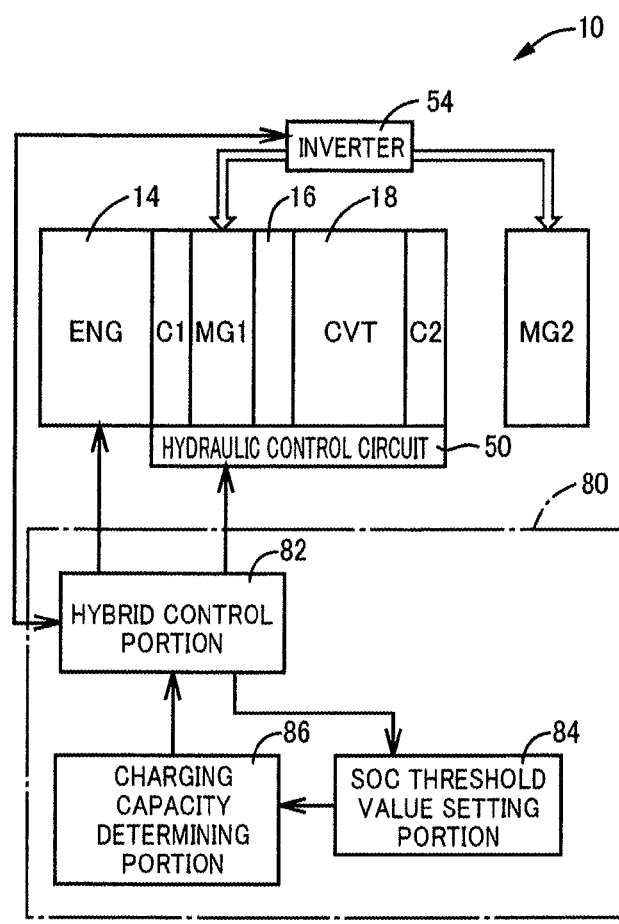
FIG. 2 is a function block diagram for explaining a main portion of a control function of an electronic control device.

FIG. 2 is a function block diagram for explaining a main portion of the control function of the electronic control device 80. In FIG. 2, a hybrid control means, i.e., a hybrid control portion 82 has, for example, a function as an engine drive control portion controlling drive of the engine 14, a function as an electric motor operation control portion controlling operations of the first electric motor MG1 and the second electric motor MG2 as a drive force source or an electric generator via the inverter 54, and a function as a clutch control portion controlling actuations of the first clutch C1 and the second clutch C2 via the hydraulic control circuit 50 and provides control of the hybrid drive by the engine 14, the first electric motor MG1, and the second electric motor MG2 through these control functions.

The hybrid control portion 82 calculates a request drive force Ftgt as a driver's drive request amount to the vehicle 10 based on the accelerator opening degree Acc and the vehicle speed V. The hybrid control portion 82 controls the running drive force source (the engine 14, the first electric motor MG1, and the second electric motor MG2) such that the request drive force Ftgt is acquired in consideration of a transmission loss, an accessory load, a gear ratio of the belt type continuously variable transmission 18, the charging capacity SOC of the electric storage device 52, etc. The drive request amount can be not only the request drive force Ftgt [N] at wheels but also a request drive torque [Nm] or a request drive power [W] at wheels, the accelerator opening degree Acc [%], etc.

Figure 3:
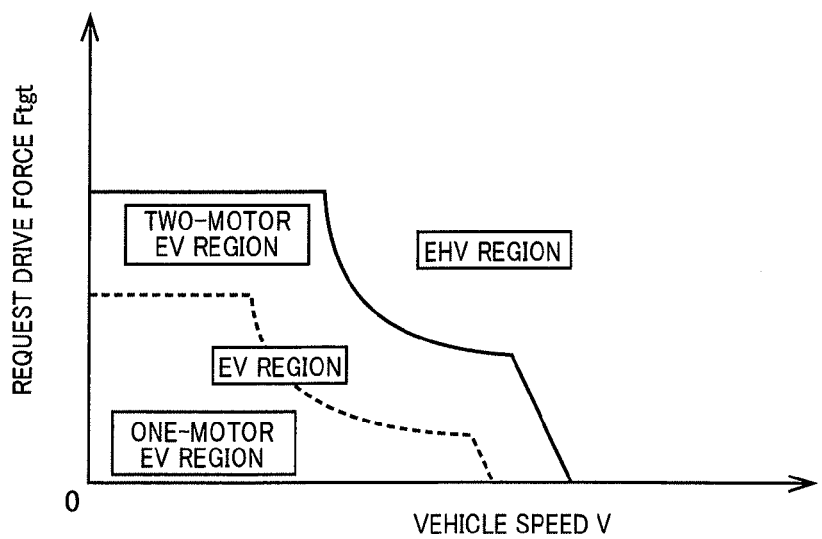
FIG. 3 is a diagram depicting an example of an EV/EHV region map used for switching between EV running and EHV running.

FIG. 3 is a diagram of a relationship (EV/EHV region map) having an EV-EHV switch line (solid line) dividing a region into a motor running region (EV region) and an engine running region (EHV region) defined in advance in two-dimensional coordinates using the vehicle speed V and the request drive force Ftgt as variables. The EV region is a region in which the request drive force Ftgt can be supported by only the electric motors MG (the first electric motor MG1 and the second electric motor MG2) and the EHV region is a region in which the request drive force Ftgt cannot be supported unless at least the engine 14 is used. For example, if a vehicle state indicated by the actual vehicle speed V and the request drive force Ftgt is within the EV region, the hybrid control portion 82 establishes a motor running mode (hereinafter, EV mode) to stop an operation of the engine 14 and perform the motor running (EV running) using only the electric motors MG as the running drive force source for running. On the other hand, for example, if the vehicle state is within the EHV region, the hybrid control portion 82 establishes an engine running mode, i.e., a hybrid running mode (hereinafter, EHV mode) to perform the engine running, i.e., the hybrid running (EHV running), using at least the engine 14 as the running drive force source for running.

The EV running in this example can be performed as, for example, EV running with one motor using only the second electric motor MG2 (hereinafter referred to as one-motor EV running) and EV running with two motors using the first electric motor MG1 and the second electric motor MG2 (hereinafter referred to as two-motor EV running). The EV/EHV region map of FIG. 3 also has a 1M-2MEV switch line (broken line) dividing the EV region into predefined one-motor and two-motor EV regions. The one-motor EV region is the EV region in which the request drive force Ftgt can be supported by only one motor that is the second electric motor MG2, and the two-motor EV region is the EV region in which the request drive force Ftgt cannot be supported unless both the first electric motor MG1 and the second electric motor MG2 are used. Therefore, the two-motor EV running and the engine running can generate larger drive force as compared to the one-motor EV running. For example, if the vehicle state is within the one-motor EV region, the hybrid control portion 82 establishes the one-motor EV mode to perform one-motor EV running using only the second electric motor MG2 as the running drive force source for running. On the other hand, for example, if the vehicle state is within the two-motor EV region, the hybrid control portion 82 establishes the two-motor EV mode to perform two-motor EV running using the first electric motor MG1 and the second electric motor MG2 as the running drive force source for running. If the two-motor EV mode is established, the hybrid control portion 82 causes the first electric motor MG1 and the second electric motor MG2 to share the request drive force Ftgt based on an operation efficiency of the first electric motor MG1 and the second electric motor MG2. As described above, in this example, the one-motor EV running, the two-motor EV running and the engine running using the drive force source including the engine 14 can be selected. In this example, the one-motor EV mode, the two-motor EV mode, and the EHV mode are referred to as a mode 1, a mode 2, and a mode 3, respectively, for convenience. Although the EV-EHV switch line and the 1M-2M EV switch line in the EV/EHV region map of FIG. 3 are represented as lines for convenience, the lines are series of points represented by a vehicle state in terms of control. Each of the EV-EHV and 1M-2M EV switch lines desirably has switch lines at the time of transition to respective regions so that hysteresis is included.

For example, if the mode 1 is established, the hybrid control portion 82 stops the engine 14 while both the first clutch C1 and the second clutch C2 are put into a released state to separate the engine 14 from the front drive wheels 24, and provides power running control of the second electric motor MG2 for running with the first electric motor MG1 put into a no-load state (i.e., a free rotation state with a torque of zero). Although the second clutch C2 may not necessarily be put into the released state in the mode 1, the second clutch C2 is desirably put into the released state in consideration of dragging etc., of the belt type continuously variable transmission 18. For example, if the mode 2 is established, the hybrid control portion 82 stops the engine 14 while the first clutch C1 is put into a released state and the second clutch C2 is put into an engaged state to separate the engine 14 from the front drive wheels 24 and to mechanically connect the first electric motor MG1 to the front drive wheels 24, and provides power running control of the first electric motor MG1 and the second electric motor MG2 for running.

For example, if the mode 3 is established, while both the first clutch C1 and the second clutch C2 are put into an engaged state to mechanically connect both the engine 14 and the first electric motor MG1 to the front drive wheels 24, the hybrid control portion 82 operates the engine 14 to use at least the engine 14 as the drive force source for running. In the mode 3, both the first electric motor MG1 and the second electric motor MG2 can be put into a no-load state to use only the engine 14 as the drive force source for running, or the power running control of at least one of the first electric motor MG1 and the second electric motor MG2 can be provided to assist the drive force from the engine 14 for running. Additionally, in the mode 3, electric generation control of the first electric motor MG1 can be provided to acquire electric power from power of the engine 14 and the electric power can be supplied to the second electric motor MG2 or used for charging the electric storage device 52.

During the EV running, the hybrid control portion 82 determines whether the electric storage device 52 must be charged by the power of the engine 14, based on the charging capacity SOC of the electric storage device 52. For example, if an actual charging capacity SOC is lower than a threshold value S1 predefined as a low charging capacity necessitating the charging of the electric storage device 52 by the power of the engine 14 during the EV running, the hybrid control portion 82 establishes the mode 3 to start the engine 14. Therefore, even when the vehicle state is in the EV region, if the charging capacity SOC is lower than the threshold value S1, the engine 14 is started. At the engine start, the hybrid control portion 82 provides engine start control by causing the first electric motor MG1 to output the starting torque while engaging the first clutch C1 to raise the engine rotation speed Ne to be equal to or greater than a predetermined engine rotation speed enabling self-sustaining operation or complete explosion and by injecting fuel to the engine 14 and igniting the engine 14 to start the engine 14.

The engine start control in the case of a shift from the mode 1 to the mode 3 will be compared with the engine start control in the case of a shift from the mode 2 to the mode 3. The engine start control in the case of a shift from the mode 1 to the mode 3 is relatively simple control since the first electric motor MG1 put into the no-load state is used for the engine start, for example. The starting torque is certainly secured within a rated torque that can be output by the first electric motor MG1. The engine start control in the case of a shift from the mode 2 to the mode 3 is relatively complicated control since the first electric motor MG1 subjected to the power running control is used for the engine start, for example. The starting torque is not secured within the rated torque of the first electric motor MG1 and a shortage may not be secured by the second electric motor MG2. Therefore, when the mode 2 is shifted to the mode 3, a drive torque tends to vary at the engine start and an engine start shock is more likely to occur as compared to when the mode 1 is shifted to the mode 3. On the other hand, when the charging capacity SOC is lower at the time of shift from the mode 1 to the mode 2, the shift to the mode 3 is more likely to occur because of the charging capacity SOC lower than the threshold value S1 as compared to when the charging capacity SOC is higher, and it is less expected that the shift to the mode 1 is made again until the charging capacity SOC becomes lower than the threshold value S1 as compared to when the charging capacity SOC is higher.

In view of the above description, if a shift to the mode 3 is made, it is desired to make the shift from the mode 1 as far as possible since the mode 1 is advantageous in suppression of the engine start shock as compared to making the shift from the mode 2. If the charging capacity SOC is relatively lower, it is not desired to make a shift from the mode 1 to the mode 2. Therefore, if the shift from the mode 1 to the mode 2 is determined, when the charging capacity SOC is relatively higher, the shift to the mode 2 is allowed, and when the charging capacity SOC is relatively lower, a shift to the mode 3 is desirably made even in the two-motor EV region, thereby making it difficult to cause a shift from the mode 2 to the mode 3, at which the engine start shock may easily occur.

Therefore, in this example, the charging capacity SOC of the electric storage device 52 allowing selection of the two-motor EV running (mode 2) is set higher than the charging capacity SOC of the electric storage device 52 allowing selection of the one-motor EV running (mode 1). Therefore, in this example, the one-motor EV running can be selected when the charging capacity SOC of the electric storage device 52 is equal to or greater than a predefined first threshold value, while the two-motor EV running can be selected when the charging capacity SOC of the electric storage device 52 is equal to or greater than a predefined second threshold value, and the second threshold value is set higher than the first threshold value. The threshold values in this case are SOC threshold values defining respective charging capacities SOC allowing shifts to the one-motor EV running and the two-motor EV running rather than defining the charging capacity SOC causing a shift from the EV running to the engine running. In other words, the second threshold value is set for making a shift to the two-motor EV running difficult, rather than narrowing the region of the charging capacity SOC capable of maintaining the two-motor EV running. Therefore, this does not mean selecting the one-motor EV running when the charging capacity SOC is equal to or greater than the first threshold value and less than the second threshold value and selecting the two-motor EV running when the charging capacity SOC is equal to or greater than the second threshold value. However, the first threshold value is implemented by using the threshold value S1 defined as the charging capacity SOC for determining a shift from the EV running to the engine running.

Figure 4:
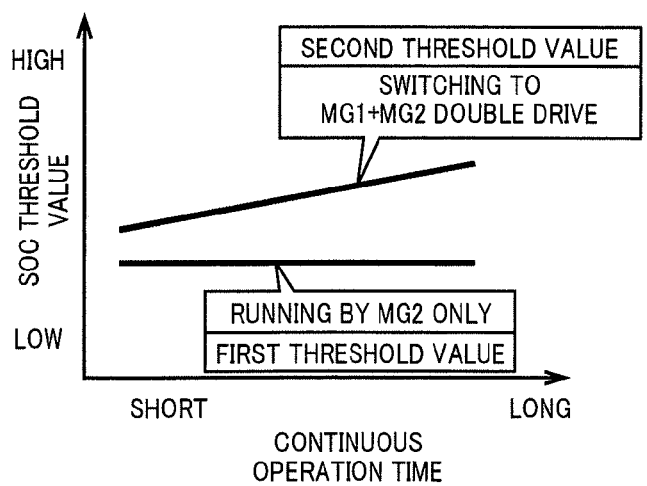
FIG. 4 is a diagram depicting an example of a SOC threshold map A used for a setting of a SOC threshold value.

Setting of the first threshold value and the second threshold value will hereinafter be exemplified. A duration time of the two-motor EV running is predicted from an immediately preceding continuous operation time under a high load running state reflecting vehicle mass, road condition, driver's habit, etc. If the continuous operation time immediately before a shift to the two-motor EV running is longer, it is considered that the duration time of the two-motor EV running tends to be longer and that the engine 14 tends to be forcibly started from the two-motor EV running. Therefore, even when the actual charging capacity SOC is relatively higher, if the continuous operation time is longer, it is desirable to facilitate the switching to the engine running without making a shift to the two-motor EV running. On the other hand, if the continuous operation time is shorter, partially because a shift to the one-motor EV running is likely to be made again during the two-motor EV running, a shift to the two-motor EV running is facilitated. Therefore, an SOC threshold value setting means, i.e., an SOC threshold value setting portion 84 changes the second threshold value based on the continuous operation time under the high load running state so that the switching from the two-motor EV running to the engine running itself is hardly caused. For example, when the continuous operation time is longer, the SOC threshold value setting portion 84 sets the second threshold value higher as compared to when the time is shorter. Specifically, the SOC threshold value setting portion 84 sets the second threshold value based on a continuous operation time until an actual current time point from a predefined relationship (SOC threshold map A) between the continuous operation time under the high load running state and the second threshold value as depicted in FIG. 4, for example. In FIG. 4, when the continuous operation time is longer, the second threshold value is made higher. The first threshold value is set to a constant value regardless of the continuous operation time. For example, the high load running state is a running state in which a decrease speed of the charging capacity SOC of the electric storage device 52 (hereinafter referred to as an SOC decrease speed) is equal to or greater than a predetermined speed defined in advance or a running state in which a driver's drive request amount to the vehicle 10 is equal to or greater than a predetermined request amount defined in advance.

Figure 5:
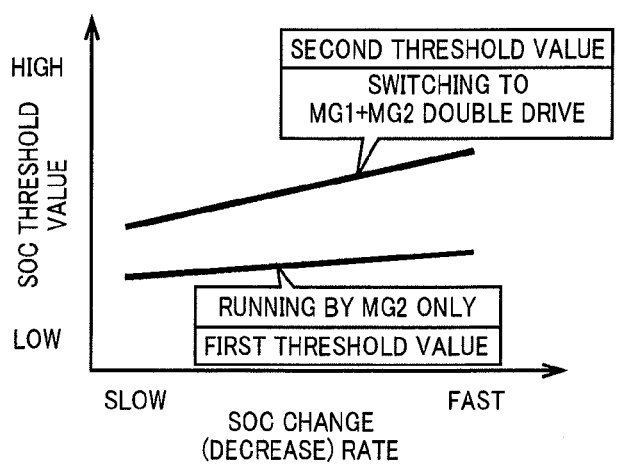
FIG. 5 is a diagram depicting an example of a SOC threshold map B used for a setting of a SOC threshold value.

If power consumption (i.e., SOC decrease speed) is faster that reflects the high load running state and a state of an electric load such as an air-conditioner immediately before a shift to the two-motor EV running, it is considered that power consumption after the shift to the two-motor EV running tends to be larger, that a time of the two-motor EV running allowed by the electric storage device 52 becomes shorter, and that the engine 14 tends to be forcibly started from the two-motor EV running. Therefore, even when the actual charging capacity SOC is relatively higher, if the SOC decrease speed is faster, it is desirable to facilitate the switching to the engine running without making a shift to the two-motor EV running. On the other hand, if the SOC decrease speed is slower, partially because a shift to the one-motor EV running is likely to be made again during the two-motor EV running, a shift to the two-motor EV running is facilitated. Therefore, the SOC threshold value setting portion 84 changes the second threshold value based on the SOC decrease speed so that the switching from the two-motor EV running to the engine running itself is hardly caused. For example, when the SOC decrease speed is faster, the SOC threshold value setting portion 84 sets the second threshold value higher as compared to when the speed is slower. Specifically, the SOC threshold value setting portion 84 sets the second threshold value based on the actual SOC decrease speed from a predefined relationship (SOC threshold map B) between the SOC decrease speed and the second threshold value as depicted in FIG. 5, for example. In FIG. 5, when the SOC decrease speed is faster, the second threshold value is made higher. The first threshold value may be set to a constant value regardless of the SOC decrease speed or the first threshold value may be set higher when the SOC decrease speed is faster as depicted in FIG. 5.

Figure 6:
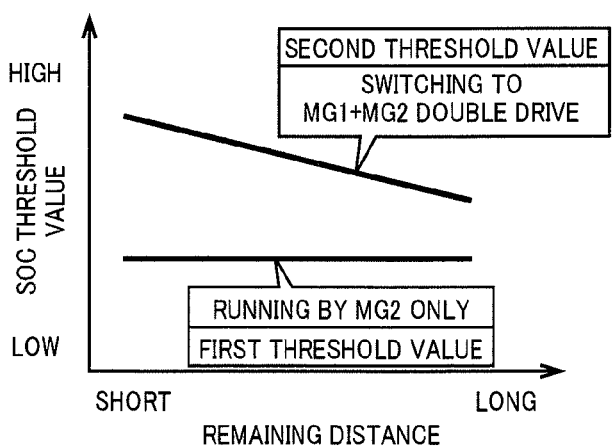
FIG. 6 is a diagram depicting an example of a SOC threshold map C used for a setting of a SOC threshold value.

If the second threshold value is changed higher, it is considered that the engine 14 is more easily started on the side of a longer remaining distance during the one-motor EV running. As a result, for example, in the case of a vehicle capable of displaying the remaining distance, the engine 14 is more easily started on the side of larger separation between the engine start and the remaining distance display, and a driver is more likely to have a feeling of strangeness. If the remaining distance during the one-motor EV running is shorter, it is considered that the engine 14 tends to be forcibly started after the shift to the two-motor EV running. Therefore, if the remaining distance during the one-motor EV running is shorter, it is desirable to facilitate the switching to the engine running without making a shift to the two-motor EV running. On the other hand, if the remaining distance during the one-motor EV running is longer, partially because a shift to the one-motor EV running is likely to be made again during the two-motor EV running, a shift to the two-motor EV running is facilitated. Therefore, the SOC threshold value setting portion 84 changes the second threshold value based on the remaining distance during the one-motor EV running so that the switching from the two-motor EV running to the engine running itself is hardly caused. For example, when the remaining distance during the one-motor EV running is longer, the SOC threshold value setting portion 84 sets the second threshold value lower as compared to when the remaining distance is shorter. As a result, the switching to the engine running is hardly caused from a state in which the remaining distance during the one-motor EV running is longer. Specifically, the SOC threshold value setting portion 84 sets the second threshold value based on the actual remaining distance during the one-motor EV running from a predefined relationship (SOC threshold map C) between the remaining distance and the second threshold value as depicted in FIG. 6, for example. In FIG. 6, when the remaining distance during the one-motor EV running is longer, the second threshold value is made lower. The first threshold value is set to a constant value regardless of the remaining distance during the one-motor EV running. The remaining distance during the one-motor EV running is a future running distance attainable by the EV running sequentially determined by the electronic control device 80 in a running state while the charging capacity SOC of the electric storage device 52 is decreasing, for example. The electronic control device 80 calculates the remaining distance during the one-motor EV running based on the actual charging capacity SOC, the SOC decrease speed, and prediction of a future running load, for example.

More specifically, returning to FIG. 2, the hybrid control portion 82 determines whether the switching to the two-motor EV running in the mode 2 occurs because of an increase in the driver's drive request amount to the vehicle 10 etc., when the one-motor EV running in the mode 1 is performed with the charging capacity SOC equal to or greater than the first threshold value, based on whether the vehicle state is shifted from the one-motor EV region to the two-motor EV region, for example (see. e.g., the EV/EHV region map of FIG. 3).

If the hybrid control portion 82 determines that the switching to the two-motor EV running occurs during the one-motor EV running, the SOC threshold value setting portion 84 sets a threshold value Sf as the second threshold value based on the vehicle state from the SOC threshold map as depicted in FIGS. 4 to 6, for example. If respective different threshold values Sf are set from the SOC threshold map as depicted in FIGS. 4 to 6, the SOC threshold value setting portion 84 sets as the threshold value Sf a largest value, a smallest value, an average value or a value with a highest priority defined in advance out of the threshold values Sf or the threshold values Sf weighed in a predefined manner, for example.

If the hybrid control portion 82 determines that the switching to the two-motor EV running occurs during the one-motor EV running, a charging capacity determining means, i.e., a charging capacity determining portion 86 determines whether the actual charging capacity SOC is lower than the threshold value Sf set by the SOC threshold value setting portion 84.

If the charging capacity determining portion 86 determines that the actual charging capacity SOC is lower than the threshold value Sf, the hybrid control portion 82 establishes the mode 3 and starts the engine 14 by the first electric motor MG1 to perform the engine running. On the other hand, if the charging capacity determining portion 86 determines that the actual charging capacity SOC is equal to or greater than the threshold value Sf, the hybrid control portion 82 establishes the mode 2 and engages the second clutch by the hydraulic control circuit 50 to perform the two-motor EV running.

Figure 7:
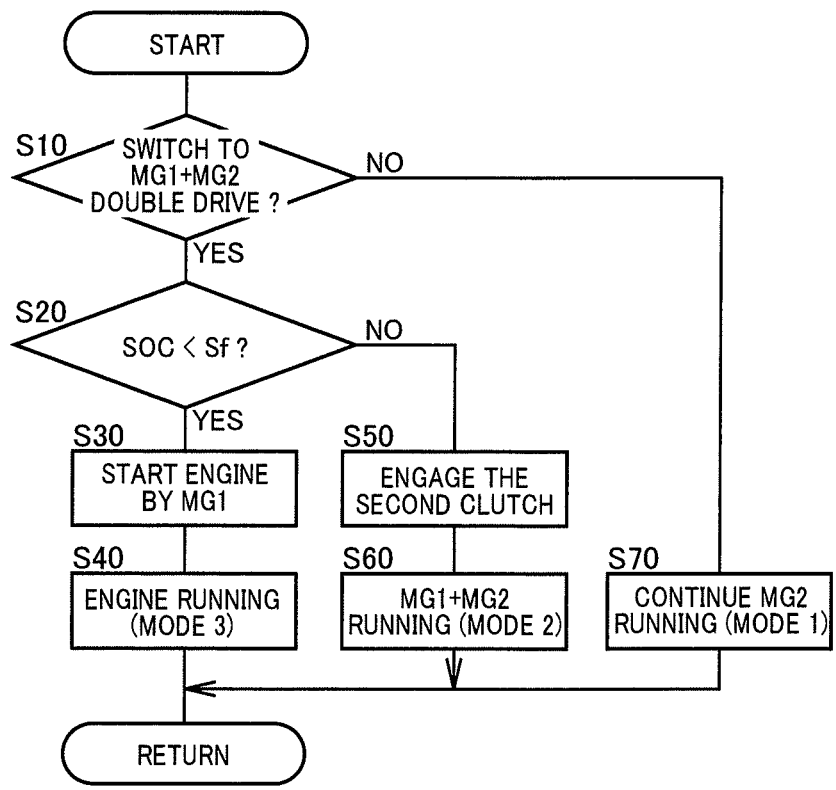
FIG. 7 is a flowchart for explaining a main portion of the control operation of the electronic control device, i.e., the control operation for suppressing occurrence frequency of an engine start shock at the engine start from the two-motor EV running.

FIG. 7 is a flowchart for explaining a main portion of the control operation of the electronic control device 80, i.e., the control operation for suppressing occurrence frequency of an engine start shock at the engine start from the two-motor EV running, and is repeatedly executed with an extremely short cycle time, for example, on the order of a few msec to a few tens of msec. The flowchart of FIG. 7 is based on the assumption of the one-motor EV running with the charging capacity SOC equal to or greater than the first threshold value.

In FIG. 7, first, at step (hereinafter, step will be omitted) S10 corresponding to the hybrid control portion 82, it is determined whether the switching to the two-motor EV running using the first electric motor MG1 and the second electric motor MG2 occurs during the one-motor EV running using the second electric motor MG2, for example. If the determination of S10 is affirmative, at S20 corresponding to the charging capacity determining portion 86, it is determined whether the actual charging capacity SOC is less than the threshold value Sf. If the determination of S20 is affirmative, at S30 and S40 corresponding to the hybrid control portion 82, the mode 3 is established and the engine 14 is started by the first electric motor MG1 while the first clutch and the second clutch are engaged to perform the engine running. In contrast, if the determination of S20 is negative, at S50 and S60 corresponding to the hybrid control portion 82, the mode 2 is established and the second clutch is engaged to perform the two-motor EV running. On the other hand, if the determination of S10 is negative, at S70 corresponding to the hybrid control portion 82, the mode 1 is maintained without change and the one-motor EV running is simply maintained.

As described above, according to this example, since the two-motor EV running is selected while the charging capacity SOC of the electric storage device 52 is higher as compared to the one-motor EV running, a time until switching to the engine running after a shift to the two-motor EV running (i.e., time until the engine 14 is started) is made longer. During this period, a measure such as starting the engine 14 from the one-motor EV running can be implemented by taking an opportunity of shifting to the one-motor EV running, and the switching from the two-motor EV running to the engine running itself is hardly caused. From another viewpoint, since the two-motor EV running is not selected at a lower charging capacity SOC resulting in relatively early switching to the engine running after the shift to the two-motor EV running, i.e., since a shift to the two-motor EV running is made difficult, the switching from the two-motor EV running to the engine running itself is hardly caused. Therefore, the occurrence frequency of an engine start shock at the engine start from the two-motor EV running can be suppressed.

According to this example, while the one-motor EV running is performed with the charging capacity SOC equal to or greater than the first threshold value, if the drive request amount is increased, the two-motor EV running is selected when the charging capacity SOC is equal to or greater than the second threshold value higher than the first threshold value, while the engine running is selected when the charging capacity SOC is less than the second threshold value, and therefore, since the duration time of the two-motor EV running after the shift to the two-motor EV running is made longer or the engine 14 is started earlier to make a shift to the two-motor EV running difficult, the switching from the two-motor EV running to the engine running itself is hardly caused.

Another example of the present invention will be described. In the following description, the portions mutually common to the examples are denoted by the same reference numerals and will not be described.

Second Example

Figure 8:
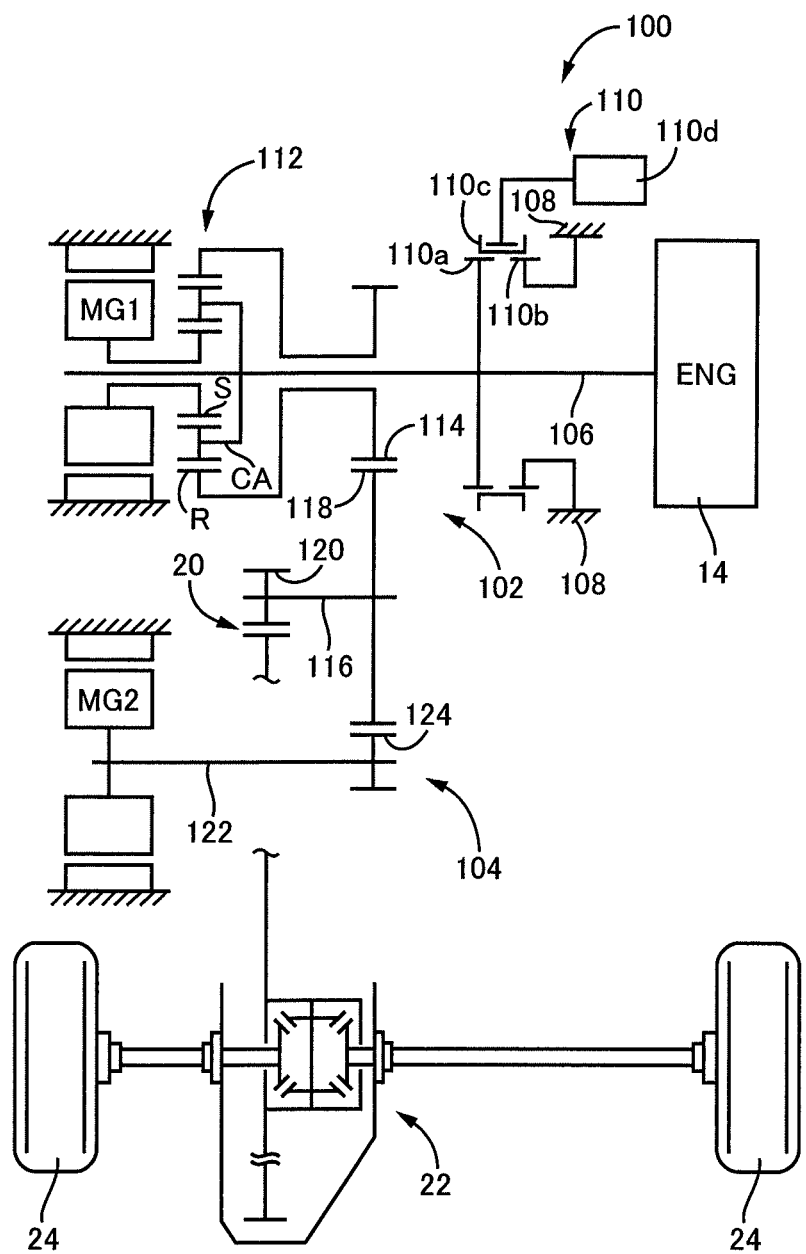
FIG. 8 is a diagram for explaining another hybrid vehicle to which the present invention is applied.

FIG. 8 is a diagram for explaining a general configuration of a hybrid vehicle 100 (hereinafter referred to as a vehicle 100) to which the present invention is applied. In FIG. 8, the vehicle 100 includes running drive force sources (the engine 14, the first electric motor MG1, and the second electric motor MG2), a first drive portion 102, a second drive portion 104, etc. The vehicle 100 includes a meshing clutch (dog clutch) 110 as a lock mechanism fixing a crankshaft 106 of the engine 14 to a housing 108 that is a non-rotating member.

The first drive portion 102 includes a planetary gear device 112 and an output gear 114. The planetary gear device 112 is a known single pinion type planetary gear device having a plurality of rotating elements respectively directly or indirectly coupled to the first electric motor MG1, the second electric motor MG2, and engine 14 and acts as a differential mechanism generating a differential effect. Specifically, the planetary gear device 112 includes a carrier CA that is an input rotating member and that is a rotating element coupled to the engine 14, a sun gear S that is a rotating element coupled to the first electric motor MG1, and a ring gear R that is an output rotating member coupled to the front drive wheels 24 in a power transmittable manner and that is a rotating element coupled to the output gear 114, and acts as an electric continuously variable transmission. The carrier CA is coupled to the housing 108 by engagement actuation (lock actuation) of the meshing clutch 110. The output gear 114 is meshed with a large diameter gear 118 disposed integrally with an intermediate output shaft 116 parallel to the crankshaft 106. The intermediate output shaft 116 is integrally disposed with a small diameter gear 120 making up one gear of the first gear pair 20.

The second drive portion 104 includes a second output gear 124 coupled to an MG2 output shaft 122 that is an output shaft of the second electric motor MG2. The second output gear 124 is meshed with the large diameter gear 118. As a result, the second electric motor MG2 is coupled to the front drive wheels 24 in a power transmittable manner.

The meshing clutch 110 includes an engine side member 110a fixedly disposed on the crankshaft 106, a housing side member 110b fixedly disposed on the housing 108, a sleeve 110c disposed to be movable (slidable) in the axial direction with a spline disposed on an inner circumferential side and meshed with meshing teeth of the engine side member 110a and the housing side member 110b, and an actuator 110d driving the sleeve 110c in the axial direction. When the sleeve 110c is meshed with the meshing teeth of both the engine side member 110a and the housing side member 110b by the actuator 110d, the crankshaft 106 is fixed (locked) to the housing 108. In other words, the engagement actuation of the meshing clutch 110 fixes the crankshaft 106 to the housing 108. On the other hand, when the sleeve 110c is meshed with only the meshing teeth of the housing side member 110b by the actuator 110d, the crankshaft 106 is made rotatable relatively to the housing 108. The configuration including the meshing clutch 110 as the lock mechanism can advantageously suppress occurrence of dragging of the crankshaft 106 relative to the housing 108.

In the vehicle 100 configured in this way, as is the case with the first example, the respective modes 1, 2, and 3 can be established based on the vehicle state to select the one-motor EV running, the two-motor EV running, and the engine running.

For example, if the mode 1 is established, the hybrid control portion 82 puts the meshing clutch 110 into a state of release actuation, stops the engine 14, and provides power running control of the second electric motor MG2 for running with the first electric motor MG1 put into a no-load state. For example, if the mode 2 is established, the hybrid control portion 82 puts the meshing clutch 110 into a state of lock actuation, stops the engine 14, and provides power running control of the first electric motor MG1 and the second electric motor MG2 for running. For example, if the mode 3 is established, the hybrid control portion 82 puts the meshing clutch 110 into the state of release actuation and uses at least the engine 14 as the drive force source for running by accepting a reaction force against the power of the engine 14 with the first electric motor MG1 to transmit an engine direct torque to the output gear 114.

Figure 9:
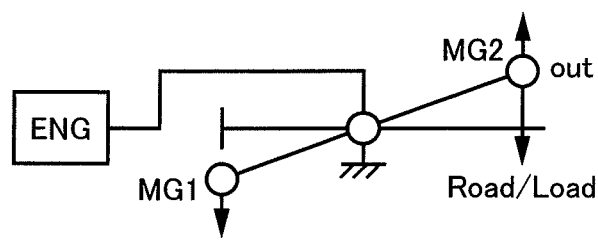
FIG. 9 is a collinear diagram capable of relatively representing rotation speeds of rotating elements in a planetary gear device, depicting a running state when a meshing clutch is engaged.

An operation of the vehicle 100 in the mode 2 will be described with reference to a collinear diagram of FIG. 9. In FIG. 9, the drive of the engine 14 is not performed and the engine 14 is non-rotatably locked by the engagement actuation of the meshing clutch 110. In a state of engagement actuation of the meshing clutch 110, a power running torque of the second electric motor MG2 is transmitted as a drive force in the vehicle forward direction to the front drive wheels 24. A reaction torque of the first electric motor MG1 is transmitted as a drive force in the vehicle forward direction to the front drive wheels 24. As a result, if the electric storage device 52 has a larger capacity (higher output power) in a plug-in hybrid vehicle employing a so-called plug-in hybrid system having the electric storage device 52 chargeable from an external power source such as a charging stand and a household power source, higher output power of the EV running can be realized while the second electric motor MG2 is restrained from increasing in size.

Figure 10:
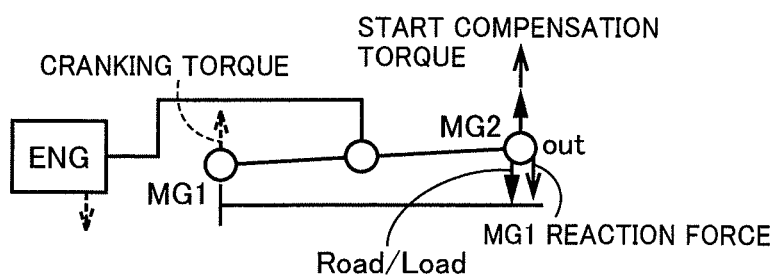
FIG. 10 is a diagram of an example of a state of torques at the engine start on the same collinear diagram as FIG. 9.

The engine start control in the case of a shift from the mode 1 to the mode 3 will be compared with the engine start control in the case of a shift from the mode 2 to the mode 3. In either case, as depicted in FIG. 10, the hybrid control portion 82 provides the engine start control by causing the first electric motor MG1 to output a cranking torque to raise the engine rotation speed Ne to be equal to or greater than a predetermined engine rotation speed enabling self-sustaining operation or complete explosion and by injecting fuel to the engine 14 and igniting the engine 14 to start the engine 14. In such engine start control, as depicted in FIG. 10, the reaction torque against the cranking torque appears on the output gear 114 side and, therefore, the hybrid control portion 82 causes the second electric motor MG2 to output a start compensation torque for canceling (offsetting) the reaction torque. Both the cranking torque and the start compensation torque are the starting torque at the engine start. The engine start control in the case of a shift from the mode 1 to the mode 3 is relatively simple control since the first electric motor MG1 put into the no-load state is used for the engine start, for example. On the other hand, the engine start control in the case of a shift from the mode 2 to the mode 3 is relatively complicated control because the first electric motor MG1 is used for the engine start by shifting from a state of power running control with a negative rotation and a negative torque to a state of power running control with a positive rotation and a positive torque, for example, and also because a non-lock actuation of the meshing clutch 110 must be achieved from the state of the lock actuation. At the engine start, the drive torque from the first electric motor MG1 generated by power running control with the negative rotation and the negative torque may not be ensured by the second electric motor MG2. Therefore, when the mode 2 is shifted to the mode 3, the engine start shock is more likely to occur as compared to when the mode 1 is shifted to the mode 3.

Therefore, in this example, from the same viewpoint as the first example, the charging capacity SOC of the electric storage device 52 allowing selection of the two-motor EV running (mode 2) is set higher than the charging capacity SOC of the electric storage device 52 allowing selection of the one-motor EV running (mode 1). Therefore, also in this example, as is the case with the first example, the occurrence frequency of an engine start shock at the engine start from the two-motor EV running can be suppressed. In this example, "ENGAGE THE SECOND CLUTCH" of step S50 of the flowchart of FIG. 7 is changed to "ENGAGE THE MESHING CLUTCH".

Although the examples of the present invention have been described in detail with reference to the drawings, the present invention is not limited to these examples and is applied in other forms.

Figure 11:
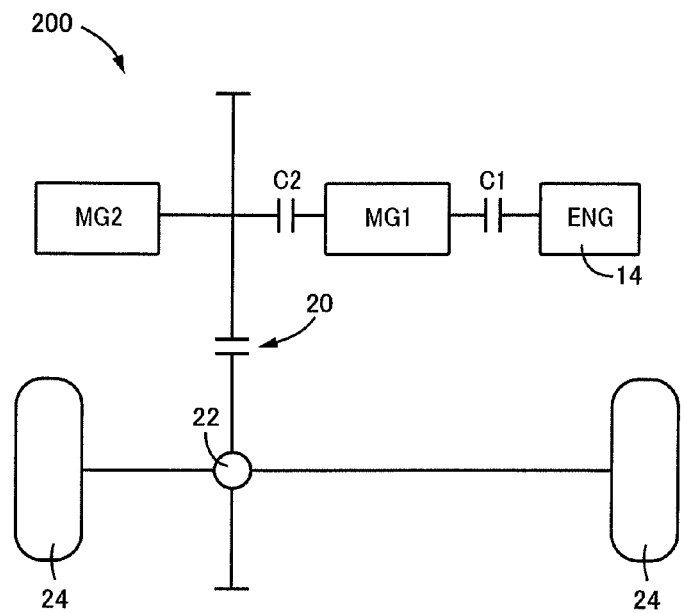
FIG. 11 is a diagram for explaining another hybrid vehicle to which the present invention is applied.

For example, although the vehicle 10 of the first example includes the belt type continuously variable transmission 18, this is not a limitation. For example, a known automatic transmission such as a planetary gear type multistage transmission and a parallel shaft type transmission may be used instead of the belt type continuously variable transmission 18. The present invention is also applicable to a vehicle without the belt type continuously variable transmission 18 as indicated by a hybrid vehicle 200 (hereinafter referred to as a vehicle 200) of FIG. 11. As indicated by the vehicle 200, the second electric motor MG2 may be coupled directly or indirectly via a gear mechanism etc. to the front drive wheels 24. The front drive wheels 24 and the rear drive wheels 30 may be inverted. In the vehicle 10, a third electric motor may be coupled to the front drive wheels 24. The vehicle 200 may include a rear drive portion using the third electric motor as a drive force source. Therefore, the two-motor EV running is EV running using at least two electric motors as the running drive force sources.

Although the meshing clutch 110 is exemplified as the lock mechanism in the second example, this is not a limitation. The lock mechanism may be, for example, a one-way clutch permitting rotation in the forward rotation direction of the crankshaft 106 and preventing rotation in the negative rotation direction, a multi-plate type hydraulic friction engagement device subjected to engagement control by a hydraulic actuator, a dry type engagement device, an electromagnetic friction engagement device (electromagnetic clutch) having an engagement state controlled by an electromagnetic actuator, and a magnetic powder clutch. The lock mechanism may be any mechanism capable of locking and unlocking the crankshaft 106 to the housing 108.

Figure 12:
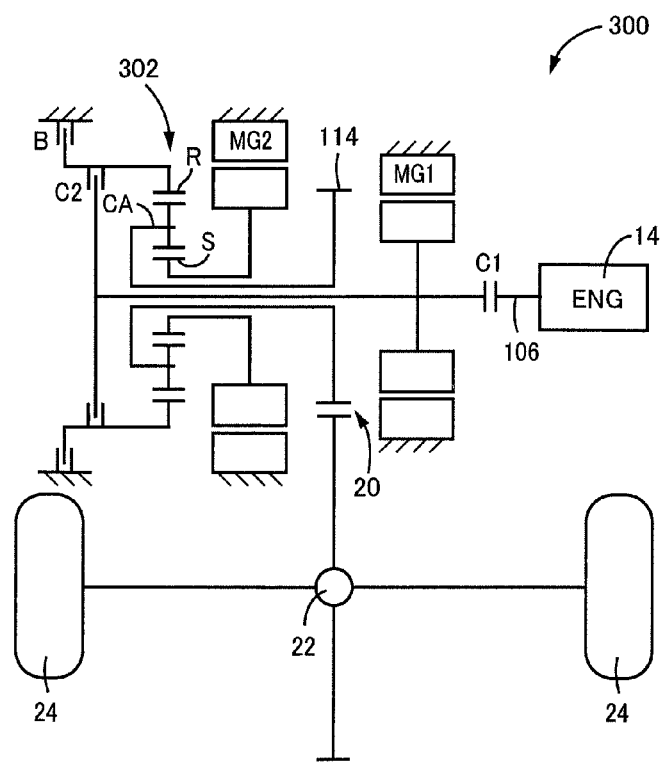
FIG. 12 is a diagram for explaining another hybrid vehicle to which the present invention is applied.

Although the vehicle 100 is exemplified as a vehicle including a differential mechanism in the second example, this is not a limitation. For example, as indicted by a hybrid vehicle 300 (hereinafter referred to as a vehicle 300) of FIG. 12, the present invention may be applied to a vehicle including a planetary gear device 302 as a differential mechanism. In the vehicle 300, for example, when the mode 1 is established, the engine 14 is stopped with the first clutch C1 and the second clutch C2 put into the released state and a brake B put into an engaged state, and the second electric motor MG2 is subjected to the power running control for running while the first electric motor MG1 is put into a no-load state. For example, when the mode 2 is established, the engine 14 is stopped with the first clutch C1 and the brake B put into a released state and the second clutch C2 put into the engaged state, and the first electric motor MG1 and the second electric motor MG2 are subjected to the power running control for running. For example, when the mode 3 is established, the first clutch C1 and the second clutch C2 are put into the engaged state and the brake B is put into the released state, and at least the engine 14 is used as the drive force source for running by accepting a reaction force against the power of the engine 14 with the second electric motor MG2.

Although the vehicles 100 and 300 are configured such that the three rotating elements of the differential mechanism are respectively coupled to the engine 14, the first electric motor MG1, and the second electric motor MG2, this is not a limitation. For example, the present invention is applicable if a differential mechanism has four or more rotating elements as a result of multiple planetary gear devices coupled to each other. An electric motor other than the first electric motor MG1 and the second electric motor MG2 may be included. The engine 14 and the multiple electric motors are coupled directly or indirectly via a gear mechanism etc., to the rotating elements of the differential mechanism. The planetary gear devices 112 and 302 may be double-planetary planetary gear devices. The planetary gear devices 112 and 302 may be differential gear devices having a pair of bevel gears meshed with a pinion, for example. In the vehicles 100 and 300, the second electric motor MG2 may be coupled directly or indirectly via a gear mechanism etc. to the output gear 114, the front drive wheels 24, etc., or may directly or indirectly be coupled to a pair of wheels different from the front drive wheels 24. If the second electric motor MG2 is coupled to a pair of different wheels, the pair of the different wheels is also included in the drive wheels. In short, the drive wheels driven by the power from the engine 14 may be wheels different from the drive wheels driven by the power from the second electric motor MG2. In the vehicles 100 and 300, the rear drive wheels 30 may be driven instead of the front drive wheels 24.

Although the threshold value S1 is used as the threshold value for determining a shift from the EV running to the engine running during both the one-motor EV running and the two-motor EV running in the examples, different threshold values may be used. Although the threshold value S1 is used as the first threshold value, this is not a limitation.

If the vehicles 10, 100, 200, and 300 are so-called plug-in hybrid vehicles having the electric storage device 52 chargeable from an external power source such as a charging stand, a household power source, etc., a state of running performed by using the electric power stored from the external power source may be defined as the state of higher charging capacity SOC, and a state of running performed by using the generated electric power stored from the power of the engine 14 may be defined as the state of lower charging capacity SOC. In other words, the two-motor EV running may be enabled while running is performed by using the electric power stored from the external power source, and the one-motor EV running may be enabled while running is performed by using the electric power stored from the power of the engine 14. Whether electric power is stored from the external power source or from the power of the engine 14 is clarified by monitoring input/output of the electric power in the electric storage device 52 or by a configuration including batteries charged with the respective electric powers, for example.

The above description is merely an embodiment and the present invention can be implemented in variously modified and improved forms based on the knowledge of those skilled in the art.

NOMENCLATURE OF ELEMENTS 10, 100, 200, 300: hybrid vehicle (vehicle) 24: front drive wheels (wheels) 30: rear drive wheels (wheels) 52: electric storage device 80: electronic control device (control device) MG1: first electric motor MG2: second electric motor

The invention claimed is:

1. A control device of a vehicle, the vehicle including an engine, a first electric motor outputting a starting torque for starting the engine, a second electric motor coupled to wheels, and an electric storage device giving/receiving electric power to/from each of the first and second electric motors, the control device being configured to select a single motor running which is performed by only the second electric motor serving as a drive force source for driving the vehicle, a multiple motor running which is performed by the first electric motor and the second electric motor serving as drive sources for driving the vehicle and which enables generation of a drive force higher than a drive force generable by the single motor running, and an engine running which is performed by at least the engine serving as a drive force source for driving the vehicle and which enables generation of a drive force higher than the drive force generable by the single motor running, such that a level of, a charging capacity of the electric storage device in which the multiple motor running is selectable is higher than a level of the charging capacity in which the single motor running is selectable, during the single motor running performed with the charging capacity being equal to or greater than a first threshold value, the control device being configured, upon increase of the drive force requested by a driver of the vehicle, to select the multiple motor running when the charging capacity is equal to or greater than a second threshold value that is higher than the first threshold value, and to select the engine running when the charging capacity of the electric storage device is less than the second threshold value.

2. The control device of claim 1, wherein
the single motor running is selectable when the charging capacity of the electric storage device is equal to or greater than first threshold value defined in advance, wherein
the multiple motor running is selectable when the charging capacity of the electric storage device is equal to or greater than the second threshold value defined in advance.

3. The control device of claim 1, comprising a threshold value setting portion that is configured to set the second threshold value, based on a continuous operation time under a high load running state, such that the second threshold value is increased with increase of the continuous operation time under the high load running state.

4. The control device of claim 1, comprising a threshold value setting portion that is configured to set at least one of the first and second threshold values, based on a decrease speed of the charging capacity of the electric storage device, such that the at least one of the first and second threshold values is increased with increase of the decrease speed of the charging capacity.

5. The control device of claim 3, comprising a threshold value setting portion that is configured to set the second threshold value, based on
a future running distance attainable by the single motor running, such that the second threshold value is reduced with increase of the future running distance attainable by the single motor running.

6. The control device of claim 1, wherein
the vehicle includes a differential mechanism that has a plurality of rotating elements respectively coupled to the first electric motor, the second electric motor, and the engine, wherein
the differential mechanism has a rotating element coupled to the first electric motor, a rotating element that is an output rotating member coupled to the wheels in a power transmittable manner, and a rotating element coupled to a crankshaft of the engine as the plurality of the rotating elements, wherein
the second electric motor is coupled to the wheels in a power transmittable manner, wherein
the vehicle includes a lock mechanism that couples one of the rotating elements other than the rotating elements coupled to the first electric motor and the second electric motor to a non-rotating member through a lock actuation, and wherein
when the engine is started during the multiple motor running using output torques outputted by both the first electric motor and the second electric motor during a state of the lock actuation of the lock mechanism, the lock mechanism is caused to perform a non-lock actuation to output a cranking torque starting the engine by the first electric motor and to compensate a reaction torque of the cranking torque by the second electric motor.

7. The control device of claim 1, wherein
the vehicle includes a differential mechanism having a plurality of rotating elements respectively coupled to the first electric motor, the second electric motor, and the engine, and a clutch connecting/disconnecting a power transmission path between the engine and the rotating element coupled to the first electric motor, wherein
one of rotating elements that is coupled to none of the first and second electric motors serves as an output rotating member, and wherein
when the engine is started during the single or multiple motor running while the vehicle is running with the clutch released, the starting torque is output by the first electric motor coupled to the clutch while the clutch is engaged.

8. The control device of a vehicle of claim 1, wherein the vehicle is a hybrid vehicle or a plug-in hybrid vehicle having the electric storage device chargeable from an external power source.

9. A control device of a vehicle, the vehicle including an engine, a first electric motor outputting a starting torque for starting the engine, a second electric motor coupled to wheels, and an electric storage device giving/receiving electric power to/from each of the first and second electric motors,
the control device being configured to select a motor running which is performed by the first electric motor and the second electric motor serving as a drive force sources for driving the vehicle and an engine running which is performed by at least the engine serving as a drive force source for driving the vehicle, wherein
the control device being configured to select the engine running so as to start the engine running when a charging capacity of the electric storage device is less than a threshold value, wherein
the motor running is selectable when the charging capacity of the electric storage device is equal to or greater than another threshold value that is higher than the threshold value, and wherein
the motor running is selectable until the charging capacity of the electric storage device becomes less than the threshold value that is lower than the another the threshold value, during the motor running.

* * * * *